US009477575B2

(12) United States Patent
Strauss

(10) Patent No.: US 9,477,575 B2
(45) Date of Patent: Oct. 25, 2016

(54) METHOD AND SYSTEM FOR IMPLEMENTING A MULTI-THREADED API STREAM REPLAY

(71) Applicant: NVIDIA Corporation, Santa Clara, CA (US)

(72) Inventor: Michael C. Strauss, Durham, NC (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 13/916,041

(22) Filed: Jun. 12, 2013

(65) Prior Publication Data

US 2014/0372990 A1    Dec. 18, 2014

(51) Int. Cl.
*G06F 9/44* (2006.01)
*G06F 11/36* (2006.01)
*G06F 11/34* (2006.01)
*G06F 11/30* (2006.01)

(52) U.S. Cl.
CPC ......... *G06F 11/362* (2013.01); *G06F 11/3003* (2013.01); *G06F 11/3093* (2013.01); *G06F 11/34* (2013.01); *G06F 11/3414* (2013.01); *G06F 11/3466* (2013.01); *G06F 11/3636* (2013.01); *G06F 2201/865* (2013.01)

(58) Field of Classification Search
CPC .................................................. G06F 11/362
USPC .......................................................... 717/133
See application file for complete search history.

(56) References Cited

U.S. PATENT DOCUMENTS

| 5,268,995 | A | 12/1993 | Diefendorff et al. |
| 5,285,323 | A | 2/1994 | Hetherington et al. |
| 5,487,022 | A | 1/1996 | Simpson et al. |
| 5,613,050 | A | 3/1997 | Hochmuth et al. |
| 5,764,228 | A | 6/1998 | Baldwin |
| 5,777,628 | A | 7/1998 | Buck-Gengler |
| 6,101,524 | A * | 8/2000 | Choi ..................... G06F 9/4881 717/127 |
| 6,166,743 | A | 12/2000 | Tanaka |
| 6,199,082 | B1 | 3/2001 | Ferrel et al. |
| 6,222,550 | B1 | 4/2001 | Rosman et al. |
| 6,288,730 | B1 | 9/2001 | Duluk, Jr. et al. |

(Continued)

OTHER PUBLICATIONS

Choi et al. "Deterministic Replay of Java Multithreaded Applications", Aug. 1998, ACM.*

(Continued)

*Primary Examiner* — Anna Deng
*Assistant Examiner* — Junchun Wu

(57) ABSTRACT

A method for debugging and includes receiving a request for capturing a frame generated by a graphics application implementing application threads executing function calls. The function calls are associated with one or more thread specific resources used at the beginning of the capturing process. For each application thread, a corresponding state is determined for each thread specific resource utilized, and a corresponding capture stream is established. For each application thread, executed function calls are captured into the corresponding capture stream. A plurality of captured function calls is arranged in the order they were executed by the graphics application. For each capture stream, a corresponding replay thread is established. Application threads, capture streams, and replay threads exist in a one-to-one-to-one relationship. Captured function calls are replayed in order, wherein each captured function call is executed in a corresponding replay thread based on which application thread executed the captured function call.

20 Claims, 6 Drawing Sheets

(56) References Cited

U.S. PATENT DOCUMENTS

| | | | |
|---|---|---|---|
| 6,442,748 B1 | 8/2002 | Bowman-Amuah | |
| 6,525,737 B1 | 2/2003 | Duluk, Jr. et al. | |
| 6,542,971 B1 | 4/2003 | Reed | |
| 6,664,958 B1 | 12/2003 | Lather et al. | |
| 6,717,577 B1 | 4/2004 | Cheng et al. | |
| 6,731,288 B2 | 5/2004 | Parsons et al. | |
| 6,738,870 B2 | 5/2004 | Van Huben et al. | |
| 7,034,828 B1 | 4/2006 | Drebin et al. | |
| 7,225,299 B1 | 5/2007 | Rozas et al. | |
| 7,257,814 B1 | 8/2007 | Melvin et al. | |
| 7,376,798 B1 | 5/2008 | Rozas | |
| 7,380,235 B1* | 5/2008 | Fathalla | G06F 11/3664 717/109 |
| 7,430,654 B2* | 9/2008 | Huang et al. | 712/217 |
| 7,506,318 B1* | 3/2009 | Lindo | G06F 11/3644 717/130 |
| 7,873,793 B1 | 1/2011 | Rozas et al. | |
| 8,276,129 B1 | 9/2012 | Kiel et al. | |
| 8,726,242 B2* | 5/2014 | Ngo | G06F 17/30174 717/127 |
| 9,256,514 B2 | 2/2016 | Kiel et al. | |
| 2002/0083217 A1 | 6/2002 | Ward et al. | |
| 2003/0208520 A1 | 11/2003 | Hewitt | |
| 2004/0012597 A1 | 1/2004 | Zatz et al. | |
| 2004/0119710 A1 | 6/2004 | Piazza et al. | |
| 2004/0194084 A1* | 9/2004 | Matsunami et al. | 717/174 |
| 2004/0246260 A1 | 12/2004 | Kim et al. | |
| 2005/0086644 A1* | 4/2005 | Chkodrov et al. | 717/124 |
| 2005/0162436 A1 | 7/2005 | Van Hook et al. | |
| 2005/0231506 A1 | 10/2005 | Simpson et al. | |
| 2005/0237337 A1 | 10/2005 | Leather et al. | |
| 2005/0273757 A1 | 12/2005 | Anderson | |
| 2006/0007234 A1 | 1/2006 | Hutchins et al. | |
| 2006/0059468 A1* | 3/2006 | Heirich | G06F 11/3664 717/125 |
| 2007/0204257 A1 | 8/2007 | Kinno et al. | |
| 2007/0250820 A1 | 10/2007 | Edwards et al. | |
| 2007/0250827 A1* | 10/2007 | Ohyama | G06F 8/30 717/162 |
| 2007/0288902 A1* | 12/2007 | Lev et al. | 717/124 |
| 2008/0034430 A1 | 2/2008 | Burtscher | |
| 2009/0241107 A1* | 9/2009 | Kobayashi | G06F 21/10 717/178 |
| 2010/0211933 A1* | 8/2010 | Kiel et al. | 717/125 |
| 2012/0144126 A1 | 6/2012 | Nimmala et al. | |
| 2012/0180023 A1* | 7/2012 | Seki | G06F 8/30 717/108 |
| 2014/0181404 A1 | 6/2014 | Chaudhary et al. | |

OTHER PUBLICATIONS

Edelstein et al. "Framework for testing multi-threaded Java programs", 2003, IBM Research Laboratory.*

Lindholm et al. "Nvidia Tesla: A Unified Graphics and Computing Architecture", 2008, IEEE.*

Geels "Replay Debugging for Distributed Applications", Dec. 2006, University of California at Berkeley.*

\* cited by examiner

METHOD AND SYSTEM FOR IMPLEMENTING A MULTI-THREADED API STREAM REPLAY

CROSS REFERENCE TO RELATED APPLICATIONS

This application is related to U.S. patent application Ser. No. 12/709,380, entitled "DEBUGGING AND PERFORMANCE ANALYSIS OF APPLICATIONS," having a filing date of Feb. 19, 2010, which is herein incorporated by reference in its entirety.

BACKGROUND

The content of a single frame in a modern graphics application continues to expand as graphics processing units (GPUs) increase in capability. This can lead to errors and performance problems that are difficult to analyze in real time while the application renders the final image. The use of multiple rendering targets, composited to construct the final image, only contributes to the difficulty of debugging and performance tuning.

A previous frame capture system describes a system for multi-threaded application programming interface (API) stream capture and single-threaded API stream replay. During API stream capture, each thread is given an object into which it can store a tokenized API stream. Each tokenized function or method is executed in a single thread.

This system is sufficient for capturing and replaying APIs where the API operates to process global data that are explicitly specified either as function or method parameters, or using a method call. In the latter case, the object invoking the method is explicit. However, the system is insufficient, particularly from a performance perspective, when data have thread affinity, or when the API makes use of data that is implicitly tied to a thread. In the worst case scenario, the single-threaded replay mechanism might need to set thread specific state for each function or method that is executed. This would lead to very poor replay performance.

SUMMARY

In embodiments of the present invention, a computer implemented method for debugging and performance analysis is described. The method includes receiving a request for capturing a frame generated by a graphics application, wherein the graphics application implements a plurality of application threads for executing a plurality of function calls generating the frame. The plurality of function calls is associated with one or more thread specific resources used at an entry point of the capturing process. The method includes for each application thread, determining a corresponding state for each corresponding thread specific resource utilized. The method includes for each application thread, establishing a corresponding capture stream, wherein application threads and capture streams exist in a one-to-one relationship. The method includes for each application thread, capturing executed function calls into the corresponding capture stream. The method includes ordering a plurality of captured function calls captured across the plurality of application threads in the order they were executed by the graphics application. The method includes for each capture stream, establishing a corresponding replay thread, wherein capture streams and replay threads exist in a one-to-one relationship. The method also includes replaying a plurality of captured function calls in the order they were captured, wherein a captured function call is executed in a corresponding replay thread based on which application thread executed the captured function call.

In other embodiments of the present invention, a non-transitory computer-readable medium is disclosed having computer-executable instructions for causing a computer system to perform a method for debugging and performance analysis. The method includes receiving a request for capturing a frame generated by a graphics application, wherein the graphics application implements a plurality of application threads for executing a plurality of function calls generating the frame. The plurality of function calls is associated with one or more thread specific resources used at an entry point of the capturing process. The method includes for each application thread, determining a corresponding state for each corresponding thread specific resource utilized. The method includes for each application thread, establishing a corresponding capture stream, wherein application threads and capture streams exist in a one-to-one relationship. The method includes for each application thread, capturing executed function calls into the corresponding capture stream. The method includes ordering a plurality of captured function calls captured across the plurality of application threads in the order they were executed by the graphics application. The method includes for each capture stream, establishing a corresponding replay thread, wherein capture streams and replay threads exist in a one-to-one relationship. The method also includes replaying a plurality of captured function calls in the order they were captured, wherein a captured function call is executed in a corresponding replay thread based on which application thread executed the captured function call.

In still other embodiments of the present invention, a computer system is disclosed comprising a processor and memory coupled to the processor and having stored therein instructions that, if executed by the computer system, cause the computer system to execute a method for debugging and performance analysis. The method includes receiving a request for capturing a frame generated by a graphics application, wherein the graphics application implements a plurality of application threads for executing a plurality of function calls generating the frame. The plurality of function calls is associated with one or more thread specific resources used at an entry point of the capturing process. The method includes for each application thread, determining a corresponding state for each corresponding thread specific resource utilized. The method includes for each application thread, establishing a corresponding capture stream, wherein application threads and capture streams exist in a one-to-one relationship. The method includes for each application thread, capturing executed function calls into the corresponding capture stream. The method includes ordering a plurality of captured function calls captured across the plurality of application threads in the order they were executed by the graphics application. The method includes for each capture stream, establishing a corresponding replay thread, wherein capture streams and replay threads exist in a one-to-one relationship. The method also includes replaying a plurality of captured function calls in the order they were captured, wherein a captured function call is executed in a corresponding replay thread based on which application thread executed the captured function call.

In another embodiment, a system for debugging and performance analysis is disclosed and includes a multi-threaded processor, graphics application programming interface, an interception layer, capture streams, replay threads, and an arbiter. The multi-threaded processor is configured for executing a plurality of function calls generated by a graphics application in association with a frame. The graphics API is configured to execute the plurality of function calls in order generate the frame suitable for display. The plurality of function calls is associated with one or more thread specific resources used at an entry point of capturing the frame. The interception layer is configured to intercept the plurality of function calls between the graphics application and the graphics API in response to a request for capturing the frame. The interception layer is configured to capture for each thread, a corresponding state for each corresponding thread specific resource utilized at the entry point. A plurality of capture streams is included in the system, wherein each capture stream is configured to capture executed function calls from a corresponding application thread. Application threads and capture streams exist in a one-to-one relationship. The system includes a plurality of replay threads, wherein each replay thread is configured to replay corresponding captured function calls originally executed on a corresponding application thread. Capture streams and replay threads exist in a one-to-one relationship. The arbiter is configured for ordering a plurality of captured function calls captured across the plurality of application threads in the order they were executed by the graphics application, such that the arbiter replays a plurality of captured function calls in the order they were captured.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "capturing," "detecting," "establishing," "ordering," "replaying," or the like, refer to actions and processes (e.g., flowchart 300 of FIG. 3) of a computer system or similar electronic computing device or processor (e.g., system 100). The computer system or similar electronic computing device manipulates and transforms data represented as physical (electronic) quantities within the computer system memories, registers or other such information storage, transmission or display devices.

Figure 3:
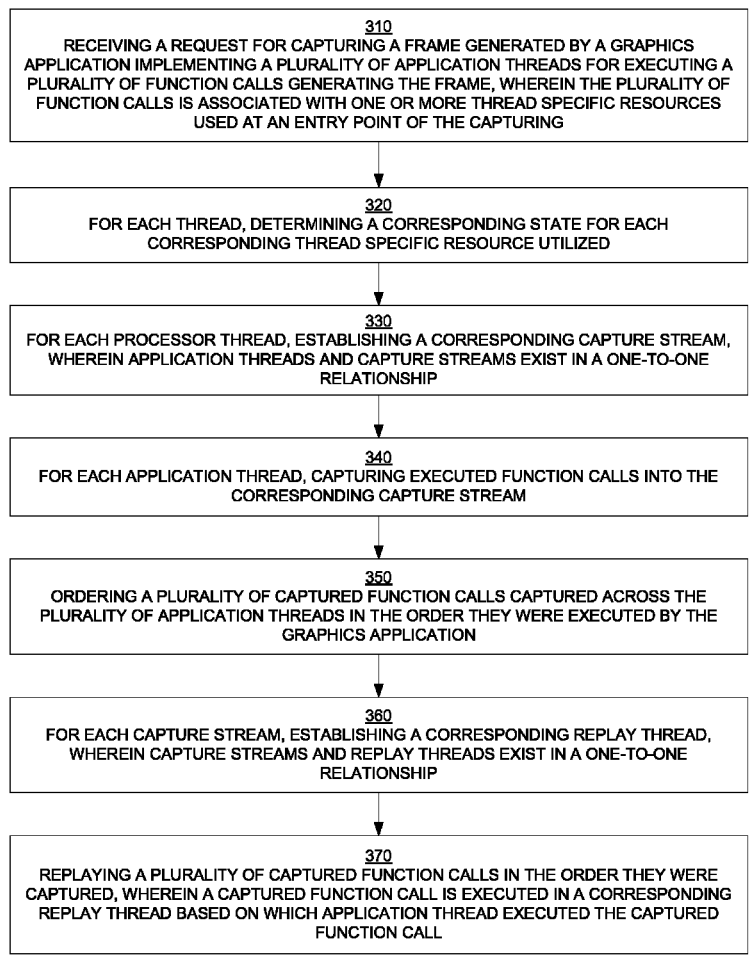
FIG. 3 is a flow diagram illustrating a method for capturing function calls in a multi-threaded processor system and replaying the function calls across multiple replay threads, in accordance with one embodiment of the present disclosure.

FIG. 3 is a flowchart of an example of a computer-implemented method for multi-threaded stream capture and replay according to embodiments of the present invention. Although specific steps are disclosed in the flowcharts, such steps are exemplary. That is, embodiments of the present invention are well-suited to performing various other steps or variations of the steps recited in the flowcharts.

Other embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

Figure 1:
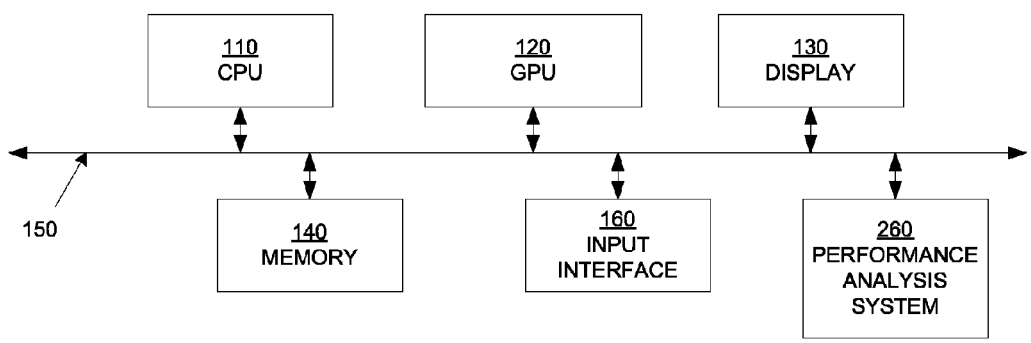
FIG. 1 depicts a block diagram of an exemplary computer system suitable for implementing the present methods, in accordance with one embodiment of the present disclosure.

FIG. 1 is a block diagram of an example of a computing system 100 capable of implementing embodiments of the present disclosure. Computing system 100 broadly represents any single or multi-processor computing device or system capable of executing computer-readable instructions. Examples of computing system 100 include, without limitation, workstations, laptops, client-side terminals, servers, distributed computing systems, handheld devices, or any other computing system or device. In its most basic configuration, computing system 100 may include at least one processor 110 and a system memory 140.

Both the central processing unit (CPU) 110 and the graphics processing unit (GPU) 120 are coupled to memory 140. System memory 140 generally represents any type or form of volatile or non-volatile storage device or medium capable of storing data and/or other computer-readable instructions. Examples of system memory 140 include, without limitation, RAM, ROM, flash memory, or any other suitable memory device. In the example of FIG. 1, memory 140 is a shared memory, whereby the memory stores instructions and data for both the CPU 110 and the GPU 120. Alternatively, there may be separate memories dedicated to the CPU 110 and the GPU 120, respectively. The memory can include a frame buffer for storing pixel data drives a display screen 130.

The system 100 includes a user interface 160 that, in one implementation, includes an on-screen cursor control device. The user interface may include a keyboard, a mouse, and/or a touch screen device (a touchpad). System 100 also includes a performance analysis system 260 that is configured for multi-threaded stream capture and replay. Analysis system 260 is further described in FIG. 2 below.

CPU 110 and/or GPU 120 generally represent any type or form of processing unit capable of processing data or interpreting and executing instructions. In certain embodiments, processors 110 and/or 120 may receive instructions from a software application or hardware module. These instructions may cause processors 110 and/or 120 to perform the functions of one or more of the example embodiments described and/or illustrated herein. For example, processors 110 and/or 120 may perform and/or be a means for performing, either alone or in combination with other elements, one or more of the monitoring, determining, gating, and detecting, or the like described herein. Processors 110 and/or 120 may also perform and/or be a means for performing any other steps, methods, or processes described and/or illustrated herein.

In some embodiments, the computer-readable medium containing a computer program may be loaded into computing system 100. All or a portion of the computer program stored on the computer-readable medium may then be stored in system memory 140 and/or various portions of storage devices. When executed by processors 110 and/or 120, a computer program loaded into computing system 100 may cause processor 110 and/or 120 to perform and/or be a means for performing the functions of the example embodiments described and/or illustrated herein. Additionally or alternatively, the example embodiments described and/or illustrated herein may be implemented in firmware and/or hardware.

Figure 2:
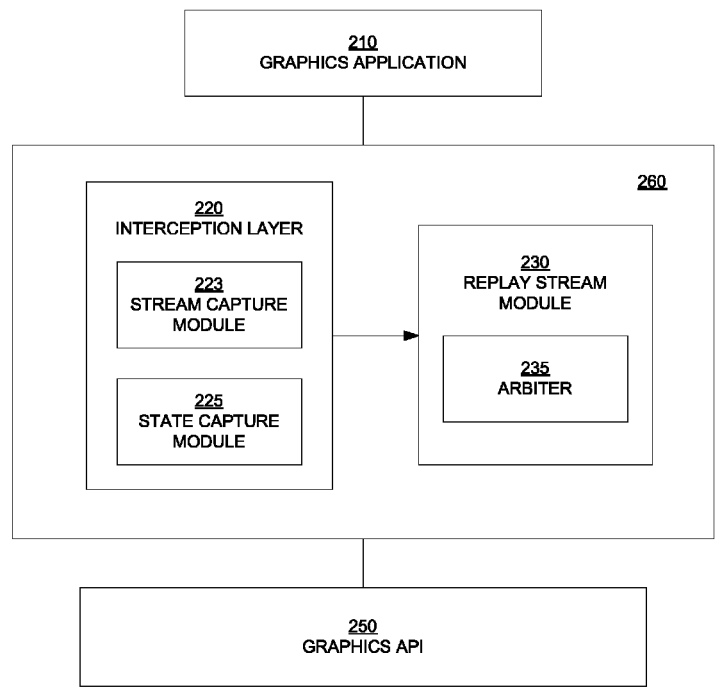
FIG. 2 is a block diagram of performance analysis system including an interception layer between an application and an application programming interface configured for capturing function calls in a multi-threaded processor system and replaying the function calls across multiple replay threads, in accordance with one embodiment of the present disclosure.

FIG. 2 is a block diagram of graphics system 200 capable of rendering one or more graphical frames. The graphics system 200 includes a performance analysis system 260 that is configured for multi-threaded stream capture and replay. As shown, the performance analysis system 260 is located between a graphics application 210 and a graphics API 250 (e.g., OpenGL, Direct3D, G3D, etc.). In embodiments, the graphics application 210, performance analysis system 260, and graphics API 250 are implemented as computer-executable instructions residing on a computer-readable medium.

The graphics application 210 includes a collection of programs enabling the generation and manipulation of images. For instance, the programs include shaders that are configured to perform different types of tasks and/or operations for purposes of graphics rendering. For instance, in some GPUs, geometry data (e.g., primitives for vertices of polygons) is input into the graphics application and subjected to the various tasks and/or operations before rendering (e.g., a frame of data). These tasks include pixel shading, vertex shading, geometry shading, etc.

The graphics application may utilize different API function calls, such as, the "draw" call, or the "swap buffers" call, to perform the different types of tasks. The API function calls initiate the tasks performed within the graphics API 250 to render a frame of data. That is, the graphics API 250 is configured to execute a plurality of function calls to generate or render the frame of data suitable for display. For instance, before executing a task, the graphics application 210 may transmit a function call to the graphics API 250 to set or change a setting for a render state. The API then passes the setting to a driver (not shown) which makes the appropriate changes to the GPU or CPU.

As previously described, the performance analysis system 260 is located between the graphics application 210 and the graphics API, and is configured to capture and replay API function calls, such as in a loop formation, for purposes of debugging and analysis of the graphics application 210. For instance, the GPU may include a multi-threaded processor configured to execute a plurality of function calls generated by a graphics application in association with a frame of data. As an advantage, implementation of the performance analysis system 260 avoids the problem of having to set thread specific state for each API function call delivered by the graphics application 210, as experienced by previous debugging solutions.

In particular, the performance analysis system 260 includes an interception layer 220 that is configured to capture the API function calls. The interception layer 220 includes a stream capture module 223 configured for capturing the plurality of API function calls (e.g., in response to a request for capturing a frame of data), wherein the plurality of function calls is associated with one or more thread specific resources used at an entry point of the capturing process. For instance, the captured API function calls are assigned to a capture stream wherein each application thread (e.g., $T_0, T_1, \ldots T_N$) is assigned an API capture stream ($S_0, S_1, \ldots S_N$), wherein application threads and capture streams exist in a one-to-one relationship. As such, a plurality of capture streams is established, wherein each stream captures executed function calls for a corresponding application thread.

The interception layer 220 also includes a state capture module 225 for capturing thread specific state of one or more thread specific resources. That is, at the time the first function/method is captured for a given application thread, the state capture module 225 captures and tracks a corresponding state for each corresponding thread specific resource utilized by the application thread.

The performance analysis system 260 also includes a replay stream module 230 that is configured to replay the captured API function calls, for example in continuous loop. For instance, when the replay process begins, a pool of replay threads (e.g., $R_0, R_1, \ldots R_N$) is created. Thread specific resources are returned to their corresponding state existing at the entry point of the capture process, and starting point of the replay process. Each replay thread is configured to replay corresponding captured function calls originally executed on a corresponding application thread, wherein capture streams and replay threads exist in a one-to-one relationship. As such, there is a direct correspondence between $T_i$, $S_i$, and $R_i$.

Further, the replay stream module 230 includes an arbiter 235 configured for ordering the plurality of function calls captured across the plurality of application threads in the order they were executed by the graphics application. During replay, the arbiter 235 arbitrates the replay of the plurality of captured function calls in the order they were captured across the plurality or pool of replay threads.

FIG. 3 is a flow diagram 300 illustrating a method and/or a computer-implemented method for capturing function calls in a multi-threaded processor system and replaying the function calls across multiple replay threads, in accordance with one embodiment of the present disclosure. In another embodiment, flow diagram 300 is implemented within a computer system including a processor and memory coupled to the processor and having stored therein instructions that, if executed by the computer system causes the system to execute a method for capturing function calls in a multi-threaded processor system and replaying the function calls across multiple replay threads. In still another embodiment, instructions for performing a method are stored on a non-transitory computer-readable storage medium having computer-executable instructions for causing a computer system to perform a method for capturing function calls in a multi-threaded processor system and replaying the function calls across multiple replay threads. The method outlined in flow diagram 300 is implementable by one or more components of the computer system 100 and graphics system 200 of FIGS. 1 and 2, respectively.

At 310, the method includes receiving a request for capturing a frame, or frame data, that is generated by a graphics application. A plurality of application threads is implemented by the graphics application, and is configured for executing a plurality of function calls generating the frame that is provided by the graphics application. The plurality of function calls is associated with one or more thread specific resources used at an entry point of capturing operation, or capturing process.

For instance, a user may observe how an application is executed by the CPU and GPU. The user may be interested in reviewing the rendering of a particular frame, or a sequence of frames because the rendered frame on a display is incorrect. As such, the user is able to initiate (e.g., actuator, button, etc.) the request for capture and/or replay of the operations (e.g., method and/or function calls) used to render the frame.

At 320, the method includes determining states for each thread specific resource utilized at the entry point of the capture and replay process. Specifically, for each application thread, a corresponding state for each corresponding thread specific resource utilized by that thread is determined and captured. In particular, at the entry point of the capture process, for a given application thread, the beginning state of any thread specific resource utilized by the application thread is determined and stored. Put another way, a context is captured for each application thread, wherein the context is utilized for executing the corresponding first or beginning function call. In that manner, replay of the captured function calls is readily implemented by returning the thread specific resources to their corresponding state.

At 330, the method includes for each application thread, establishing a corresponding capture stream. Application threads and capture streams exist in a one-to-one relationship. For instance, the captured API function calls are assigned to a capture stream wherein each application thread (e.g., $T_0, T_1, \ldots T_N$) is assigned an API capture stream ($S_0, S_1, \ldots S_N$) in a one-to-one relationship.

At 340, the method includes for each application thread, capturing executed method and/or function calls into a corresponding capture stream. As such, a plurality of capture streams is established, wherein each stream captures executed function calls for a corresponding application thread. That is, function calls as executed by a particular application thread are captured and collected into a corresponding API capture stream (e.g., function calls for application thread $T_i$ are captured and collected in capture stream $S_i$).

At 350, the method includes ordering a plurality of captured function calls collected or captured across the plurality of application threads in the order they were executed by the graphics application. By ordering the captured function calls, during replay, the function calls are again executed in order so that the performances of the CPU and GPU when executing the graphics application are reproducible. As examples of ordering, in one implementation a time-stamp is associated with each captured function call. In another implementation, a sequence number is determined and/or assigned for each captured function call, wherein no two captured function calls have the same sequence number.

Other means and/or methods for ordering the plurality of captured function calls are also supported. For instance, in one embodiment, for systems that do not require an exact duplicate replay each time, a performance improvement includes performing resource dependency analysis to detect read/write hazards across the threads. In such a system, replay threads are allowed to execute simultaneously. Serialization is performed as necessary to avoid any hazards.

At 360, the method includes establishing a corresponding replay thread ($R_0, R_1, \ldots R_N$) for each capture stream ($S_0, S_1, \ldots S_N$), wherein capture streams and replay threads exist in a one-to-one relationship (e.g., $S_i$ and $R_i$). Correspondingly, application threads, capture streams, and replay threads are related in one-to-one-to-one associations (e.g., $T_i$, $S_i$, and $R_i$).

At 370, the method includes replaying a plurality of captured function calls in the order they were captured and/or originally executed, wherein a captured function call is executed in a corresponding replay thread based on which application thread executed the captured function call. More particularly, during replay any thread specific resources associated with a corresponding application thread $T_i$ are cloned for the associated replay thread $R_i$. At the beginning of each replay of the of the API capture stream $S_i$ by replay thread $R_i$, the thread specific state associated with the corresponding application thread $T_i$ is restored for replay thread $R_i$ using the corresponding thread specific state associated with $T_i$. For instance, the thread specific state associated with $T_i$ is stored in the corresponding API capture stream $S_i$ at the time the first function and/or method was captured from $T_i$ during the capture process.

In this manner, thread specific state for each and every API method and/or function call prior to execution need not be restored. Instead, just the initial thread specific state for each corresponding application thread is required for the replay process. Subsequent thread specific state for function calls to be executed are inherently established and known through the execution of previous function calls.

Figure 4:
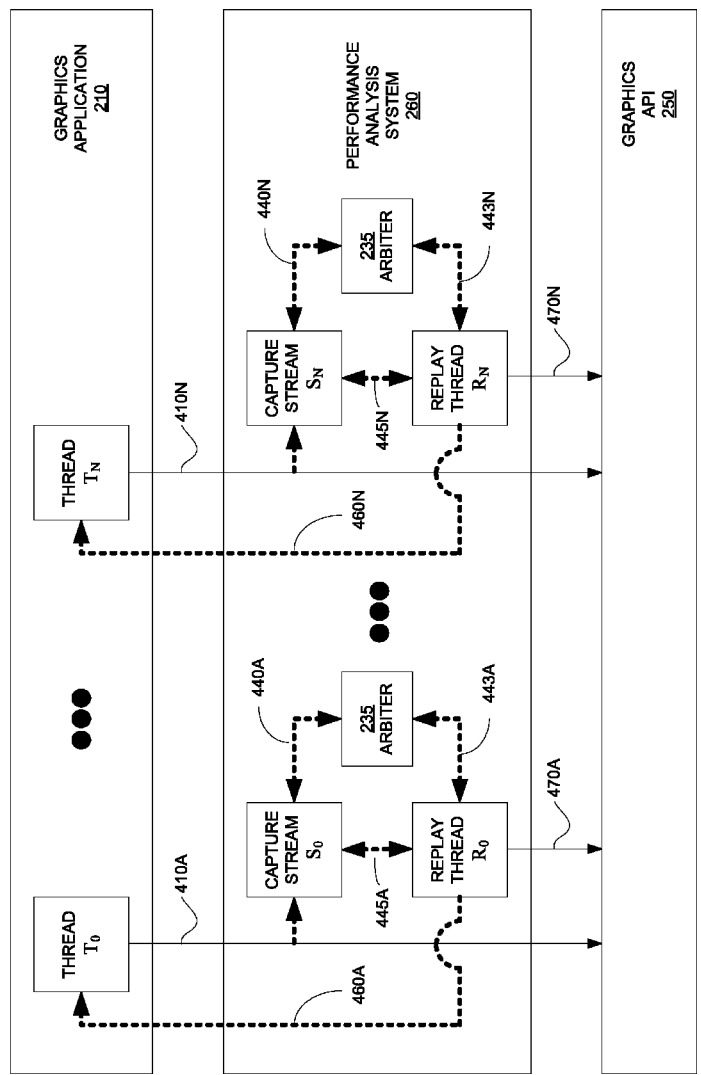
FIG. 4 is a diagram illustrating the flow of information when capturing function calls in a multi-threaded processor system and replaying the function calls across multiple replay threads, in accordance with one embodiment of the present disclosure.

FIG. 4 is a diagram 400 illustrating the flow of information when capturing function calls in a multi-threaded processor system and replaying the function calls across multiple replay threads, in accordance with one embodiment of the present disclosure. In one embodiment, diagram 400 illustrates information flow in a graphics system 200 of FIG. 2. For instance, diagram 400 illustrates the capture of function calls between a graphics application 210 and a graphics API 250.

As shown, the graphics application 210 establishes multiple application threads $T_0, T_1, \ldots T_N$ in order to graphically render one or more frames configurable for display. Each of the application threads delivers function calls to a graphics API 250 to perform tasks capable of rendering the frame of data in a manner suitable for display. For instance, a thread $T_i$ is shown as originating in the graphics application 210 (e.g., $T_0$ on up to $T_N$), and passing function calls through the performance analysis system 260 to the graphics API 250 for execution (e.g., thread $T_0$ passes function calls over path 410A for execution by the graphics API 250, and thread $T_1$ passes function calls over path 410B to the graphics API 250).

Additionally, related information associated with the function call is captured. In one embodiment, that related information is captured regardless of whether the function calls are captured during a capture process. For instance, when frame capture is not being performed, the performance analysis system 260 passes function calls to the graphics API for execution, but also captures state of the API (e.g., settings, selected objects, etc.). In that manner, performance analysis system 260, including the interception layer) is transparent to the graphics application 210 and the graphics API 250.

As previously described, the performance analysis system 260 is configured to capture function calls between a graphics application 210 and a graphics API 250 while operating on a frame of interest. As such, function calls for each thread are recorded to corresponding and individual capture streams. For instance, function calls in representative application thread $T_i$ are captured in corresponding capture stream $S_i$. In embodiments of the present invention, the capture process includes any suitable means for capturing function calls, and ordering the function calls as they are being captured in association with their order of execution.

In one embodiment, the arbiter 235 coordinates the capture and ordering of function calls across all of the capture streams $S_0, S_1, \ldots S_N$.

The performance analysis system 260 is configured to create, maintain, coordinate, perform, and/or manage the replaying of the captured function calls. For instance, a representative replay thread $R_i$ is spawned in association with a corresponding capture stream $S_i$. At replay initialization, thread specific resources in states associated with the beginning of the capture process are cloned and/or made available for the corresponding replay thread to use. As such, at the beginning of each replay loop, the thread specific resources are restored to their original state (e.g., the state they were in at the beginning of capture). In one embodiment, any state used by the graphics API 250 that is implicitly accessed through thread local storage is restored.

In one embodiment, the arbiter 235 coordinates the replay of the function calls captured across the multiple application threads. In one implementation, replay occurs when an end-of-frame maker is detected during the capture process. The function calls are replayed across multiple replay threads $R_0, R_1, \ldots R_N$ in order from earliest to latest based on their original execution ordering, and correspondingly their capture ordering. In particular, arbiter 235 determines the ordering (e.g., time-stamp, sequence number) of the function call that should be executed next across the multiple replay threads $R_0, R_1, \ldots R_N$.

Each replay thread replays directly from the associated capture stream as directed by the arbiter 235. For instance, capture stream $S_0$ provides the function calls for execution by the corresponding replay thread $R_0$. As shown, replay thread $R_0$ requests and receives the next function call for execution from capture stream $S_0$ over path 445A, and replay thread $R_N$ requests and receives the next function for execution from capture stream $S_N$ over path 445N. In general, representative replay thread $R_i$ replays function calls provided by a corresponding capture stream $S_i$.

More particularly, the replay threads wait on the arbiter 235 to allow them to execute a function call when appropriate. That is, information is received from each capture stream/replay thread combination related to the next captured function call in a position for execution. For example, in one embodiment, arbiter 235 receives information (e.g., function calls and ordering information) from the capture streams $S_0, \ldots S_N$ (e.g., arbiter 235 receives information from capture stream $S_0$ over path 440A, and arbiter 235 receives information from capture stream $S_N$ over path 440N. In another embodiment, arbiter 235 receives information relating to the next function call ready for execution from each of the replay threads $R_0$ on up to $R_N$ (e.g., arbiter 235 receives information relating to its next function call from replay thread $R_0$ over path 443A, and arbiter 235 receives information relating to its next function call from replay thread $R_1$. As such, the arbiter 235 at any point in time has a pool of function calls ready for execution by each of the replay threads. By comparing the ordering of the function calls in that pool, the arbiter 235 is able to determine the smallest ordered captured function call in a position for execution, and then direct the corresponding replay thread to execute that function call over path 440B.

During the capture process, capture and execution of the captured function calls is performed within and/or within the control of the performance analysis system 260. For instance, each of the replay threads ($R_0, R_1 \ldots R_N$) created by and maintained by the performance analysis system 260 calls into the graphics API 250 for execution of corresponding function calls (e.g., replay thread $R_0$ makes calls into the graphics API 250 over path 470A, and replay thread $R_N$ makes calls into the graphics API 250 over path 470N). As such, the captured function calls are capable of being replayed by replay threads $R_0$, $R_1$, . . . $R_N$ in a loop, as controlled by the arbiter 235, until the proper analysis is completed.

When the capture and replay process is released, the execution of function calls are returned back within the control of their corresponding application threads. This is shown by the return paths 460A and 460N. For example, arbiter 235 returns control of function call execution back to application thread $T_0$ on path 460A, . . . and returns control back to application thread $T_N$ on path 460N.

Figure 5A:
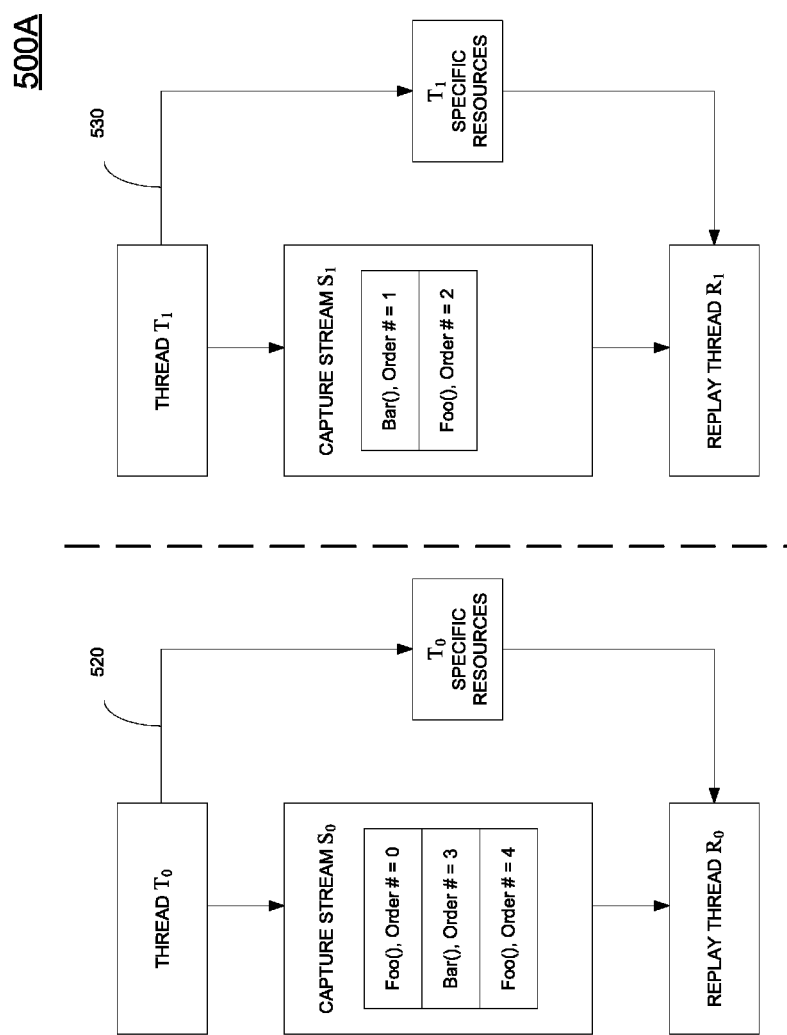
FIGS. 5A-B are diagrams illustrating an example of multi-threaded API stream capture and replay, in accordance with one embodiment of the present disclosure.
Figure 5B:
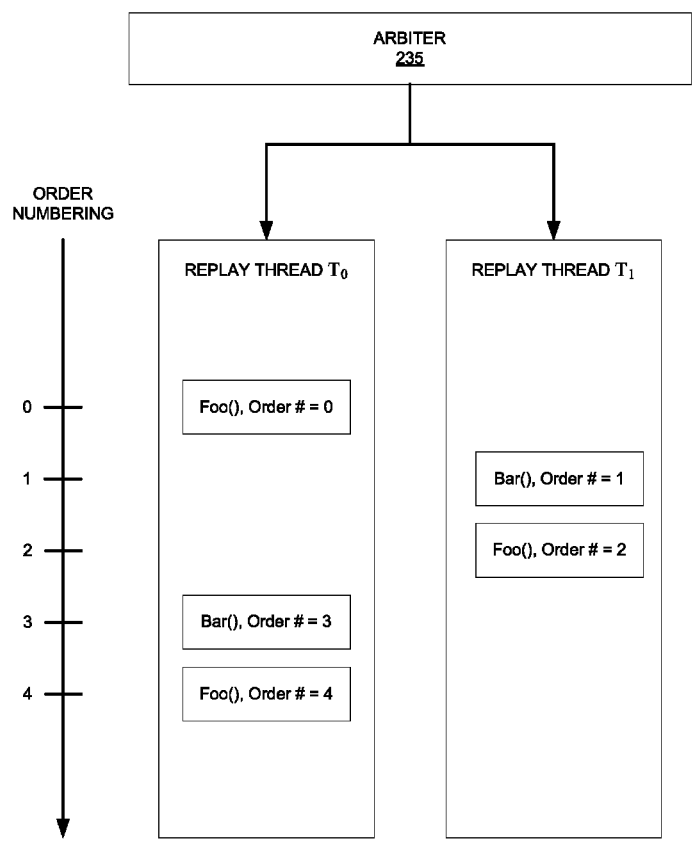

FIGS. 5A-B are diagrams illustrating an example of multi-threaded API stream capture and replay, in accordance with one embodiment of the present disclosure. In particular, FIG. 5A is a diagram 500A illustrating the flow of information when capturing function calls from application threads of a graphics application. FIG. 5B is a diagram 500B illustrating the replay of the function calls captured in FIG. 5A.

As shown in FIG. 5A, two application threads $T_0$ and $T_1$ are established by a graphics application. At the beginning of the capture process, thread specific resources are captured and tracked. More particularly, state is captured for thread specific resources. For example, the state for resources specific to thread $T_0$ is captured along path 520. Also, the state for resources specific to thread $T_1$ is captured along path 530.

Also, function calls are captured for each thread. For instance, capture stream $S_0$ captures function calls related to thread $T_0$. In addition, ordering information is also captured. As such, capture stream $S_0$ includes function call "Foo" with order number 0; function call "Bar" with order number 3; and function call "Foo" with order number 4. In addition, capture stream $S_1$ includes function call "Bar" with order number 1: and function call "Foo" with order number 2.

Each capture stream is associated with a corresponding replay thread. At replay initialization, thread specific resources are cloned or made available for the replay thread to use, as previously described. For instance, capture stream $S_0$ is associated with replay thread $R_0$, and capture stream $S_1$ is associated with replay thread $R_1$.

As shown in FIG. 5B, the arbiter 235 controls the execution order of the captured function calls. This is accomplished by the ordering of the captured function calls (e.g., by sequence number, time-stamp, etc.). In one implementation, the replay threads inform the arbiter 235 which function call is next-in-line within their respective threads for execution, based on corresponding ordering. By comparing the ordering within the sample pool, the arbiter is able to determine which function call should be next executed. As such, the replay threads wait on the arbiter 235 to allow them to execute a function when it is appropriate.

For instance, at the beginning of the replay process, replay thread $T_0$ informs arbiter 235 that the smallest ordered function call is "Foo" with order number 0, and replay thread $T_1$ informs arbiter 235 that its smallest ordered function call is "Bar" with order number 1. By comparison of order numbers (e.g., original execution order of function calls), the arbiter 235 is able to determine that "Foo" with order number 0 should be executed before "Bar" with order number 1. As such, arbiter 235 is configured to direct replay thread $T_0$ to execute its next in line function call (e.g., "Foo" at order number 0).

After selection of "Foo" with order number 0 for execution, replay thread $T_0$ sends to the arbiter its next smallest ordered function call, "Bar" with order number 3. As such, the arbiter knows that replay thread $T_0$ has a smallest ordered function call ready for execution called "Bar" with order number 3. By comparison of order numbers, the arbiter 235 is able to determine that "Bar" with order number 1 is next in line, since it is smaller in order than "Bar" with order number 3 from thread $T_0$.

The same process is completed until all the function calls have been executed in their corresponding replay threads. In the example shown in FIGS. 5A-B, each replay loop begins with order number 0. Replay thread $R_1$ would wait, while replay thread $R_0$ executes the function call with order number 0. Once execution is complete, replay thread $R_0$ will wait, and replay thread $R_1$ is allowed to execute the function call with order number 1, and then with order number 2. Then, replay thread $R_1$ waits while replay thread $R_0$ is allowed to execution the function call with order number 3, and subsequently order number 4. As such, the order of executed function calls in the replay process is as follows: "Foo" with order number 0 executed by thread $T_0$; "Bar" with order number 1 executed by thread $T_1$; "Foo" with order number 2 executed by thread $T_1$; "Foo" with order number 2 executed by thread $T_1$; "Bar" with order number 3 executed by thread $T_0$; and "Foo" with order number 4 executed by thread $T_0$. The captured function calls may be executed continuously in a loop, or released, so that the application is able to continue execution of subsequent function calls.

Thus, according to embodiments of the present disclosure, systems and methods are described providing for multi-threaded API stream capture and replay.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the present disclosure are thus described. While the present disclosure has been described in particular embodiments, it should be appreciated that the disclosure should not be construed as limited by such embodiments, but rather construed according to the below claims.

What is claimed:

1. A non-transitory computer-readable medium having computer-executable instructions for causing a computer system to perform a method for debugging, comprising:
    receiving a request for capturing a frame generated by a graphics application implementing a plurality of application threads for executing a plurality of function calls generating said frame, wherein said plurality of function calls is associated with one or more thread specific resources used at an entry point of said capturing;
    for each application thread, determining a corresponding state at said entry point for each corresponding thread specific resource utilized;
    for each application thread, establishing a corresponding capture stream, wherein application threads and capture streams exist in a one-to-one relationship;
    for each application thread, capturing executed function calls into said corresponding capture stream;
    ordering a plurality of captured function calls captured across said plurality of application threads in the order they were executed by said graphics application;
    for each capture stream, establishing a corresponding replay thread, wherein capture streams and replay threads exist in a one-to-one relationship; and
    replaying a plurality of captured function calls in the order they were captured, wherein a captured function call is executed in a corresponding replay thread based on which application thread executed said captured function call.

2. The non-transitory computer-readable medium of claim 1, wherein said ordering in said method comprises:
    associating a time-stamp for each captured function call.

3. The non-transitory computer-readable medium of claim 1, wherein said ordering in said method comprises:
    determining a corresponding sequence number for each captured function call, wherein no two captured function calls have the same sequence number.

4. The non-transitory computer-readable medium of claim 1, wherein said replaying in said method comprises:
    receiving from each replay thread information related to its next captured function call in a position for execution;
    determining a smallest ordered captured function call; and
    executing said smallest ordered captured function call.

5. The non-transitory computer-readable medium of claim 1, wherein said replaying in said method comprises:
    determining a pool of non-executed captured function calls;
    determining a smallest ordered captured function call; and
    executing said smallest ordered captured function call.

6. The non-transitory computer-readable medium of claim 1, wherein said determining a corresponding state in said method further comprises:
    for each thread, capturing a context utilized for executing a corresponding first function call.

7. The non-transitory computer-readable medium of claim 1, wherein said capturing executed function calls in said method further comprises:
    capturing information related to a corresponding captured executed function call.

8. The non-transitory computer-readable medium of claim 1, wherein said replaying a plurality of captured function calls in said method further comprises:
    detecting an end-of-frame marker;
    restoring for each thread its corresponding state for each of said corresponding thread specific resource utilized; and
    determining a pool of non-executed captured function calls;
    determining a smallest ordered captured function call; and
    executing said smallest ordered captured function call.

9. A system for debugging, comprising:
    a multi-threaded processor for executing a plurality of function calls generated by a graphics application in association with a frame;
    a graphics application programming interface (API) configured to execute said plurality of function calls to generate said frame suitable for display, wherein said plurality of function calls is associated with one or more thread specific resources used at an entry point of capturing said frame;
    an interception layer configured to intercept said plurality of function calls between said graphics application and said graphics API in response to a request for capturing said frame, wherein said interception layer is configured to capture for each thread, a corresponding state for each corresponding thread specific resource utilized at said entry point;
    a plurality of capture streams each configured to capture executed function calls from a corresponding application thread, wherein application threads and capture streams exist in a one-to-one relationship; and
    a plurality of replay threads each configured to replay corresponding captured function calls originally executed on a corresponding application thread, wherein capture streams and replay threads exist in a one-to-one relationship; and
    an arbiter configured for ordering a plurality of captured function calls captured across said plurality of application threads in the order they were executed by said graphics application, and wherein said arbiter replays a plurality of captured function calls in the order they were captured.

10. The system of claim 9, wherein said arbiter is configured for associating a time-stamp for each captured function call.

11. The system of claim 9, wherein said arbiter is configured for determining a corresponding sequence number for each captured function call, wherein no two captured function calls have the same sequence number.

12. The system of claim 9, wherein said arbiter is configured for receiving from each replay thread information related to its next captured function call in a position for execution, and for determining a smallest ordered captured function call, and for executing said smallest ordered captured function call.

13. The system of claim 9, wherein said arbiter is configured for determining a pool of non-executed captured function calls, for determining a smallest ordered captured function call, and for executing said smallest ordered captured function call.

14. The system of claim 9, wherein said arbiter is configured for restoring for each thread its corresponding state for each of said corresponding thread specific resource utilized when detecting an end-of-frame marker, and determining a pool of non-executed captured function calls, and determining a smallest ordered captured function call, and executing said smallest ordered captured function call.

15. The system of claim 9, wherein said interception layer is configured for capturing information related to a corresponding captured executed function call.

16. A computer system comprising:
a processor; and
memory coupled to said processor and having stored therein instructions that, if executed by said computer system, cause said computer system to execute a method of debugging comprising:
receiving a request for capturing a frame generated by a graphics application implementing a plurality of application threads for executing a plurality of function calls generating said frame, wherein said plurality of function calls is associated with one or more thread specific resources used at an entry point of said capturing;
for each thread, determining a corresponding state at said entry point for each corresponding thread specific resource utilized;
for each application thread, establishing a corresponding capture stream, wherein application threads and capture streams exist in a one-to-one relationship;
for each thread, capturing executed function calls into said corresponding capture stream;
ordering a plurality of captured function calls captured across said plurality of application threads in the order they were executed by said graphics application;
for each capture stream establishing a corresponding replay thread, wherein capture streams and replay threads exist in a one-to-one relationship; and
replaying a plurality of captured function calls in the order they were captured, wherein a captured function call is executed in a corresponding replay thread based on which application thread executed said captured function call.

17. The computer system of claim 16, wherein said ordering in said method comprises:
determining a corresponding sequence number for each captured function call, wherein no two captured function calls have the same sequence number.

18. The computer system of claim 16, wherein said replaying in said method comprises:
determining a pool of non-executed captured function calls;
determining a smallest ordered captured function call; and
executing said smallest ordered captured function call.

19. The computer system of claim 16, wherein said replaying a plurality of captured function calls in said method further comprises:
detecting an end-of-frame marker;
restoring for each thread its corresponding state for each of said corresponding thread specific resource utilized; and
determining a pool of non-executed captured function calls;
determining a smallest ordered captured function call; and
executing said smallest ordered captured function call.

20. The computer system of claim 16, wherein said determining a corresponding state for each corresponding thread specific resource utilized defines a context in a corresponding application thread.

* * * * *